United States Patent
Van Der Meer et al.

(10) Patent No.: US 12,538,892 B2
(45) Date of Patent: Feb. 3, 2026

(54) MILKING SYSTEM WITH A POSITIONING AID

(71) Applicant: LELY PATENT N.V., Maassluis (NL)

(72) Inventors: Martinus Cornelis Van Der Meer, Hazerswoude (NL); Han Johannes Marinus Peeters, Halsteren (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 18/849,182

(22) PCT Filed: Apr. 6, 2023

(86) PCT No.: PCT/IB2023/053537
§ 371 (c)(1),
(2) Date: Sep. 20, 2024

(87) PCT Pub. No.: WO2023/199186
PCT Pub. Date: Oct. 19, 2023

(65) Prior Publication Data
US 2025/0234833 A1    Jul. 24, 2025

(30) Foreign Application Priority Data
Apr. 12, 2022 (NL) ...................................... 2031552

(51) Int. Cl.
*A01J 5/017* (2006.01)
*A01J 5/007* (2006.01)
(Continued)

(52) U.S. Cl.
CPC .............. *A01J 5/0175* (2013.01); *A01J 5/007* (2013.01); *A01K 1/0613* (2013.01); *A01K 1/12* (2013.01)

(58) Field of Classification Search
CPC .......... A01J 5/0175; A01J 5/007; A01J 5/017; A01J 5/003; A01K 1/0613; A01K 1/12
See application file for complete search history.

(56) References Cited

U.S. PATENT DOCUMENTS

| 4,805,559 | A | 2/1989 | Van Der Lely et al. |
| 11,064,674 | B1* | 7/2021 | Rousseau .................. A01J 7/04 |

(Continued)

FOREIGN PATENT DOCUMENTS

| EP | 1 020 111 A1 | 7/2000 |
| WO | WO 01/15517 A1 | 3/2001 |
| WO | WO 01/30134 A1 | 5/2001 |

OTHER PUBLICATIONS

International Search Report issued Jun. 28, 2023 in PCT/IB2023/053537 filed Apr. 6, 2023, 4 pages.

*Primary Examiner* — Joshua D Huson
*Assistant Examiner* — Spencer T Callaway
(74) *Attorney, Agent, or Firm* — Oblon, McClelland, Maier & Neustadt, L.L.P.

(57) ABSTRACT

A robot milking system, including: at least one milking box; milking apparatus; a robot arm configured to connect the milking apparatus to a milking animal; an animal recognition device configured to automatically determine an identity of the milking animal; a control system configured to control the robot milking system; and a positioning aid configured to determine a position of the milking animal in the milking box, where: the positioning aid is movable by the control system between an inactive state away from the milking animal and an active state up against the milking animal, the positioning aid is in the active state at least when the milking apparatus is connected to the milking animal, and the control system is configured to bring the positioning aid into the active state as a function of the identity determined by the animal recognition device.

19 Claims, 1 Drawing Sheet

Figure 1:
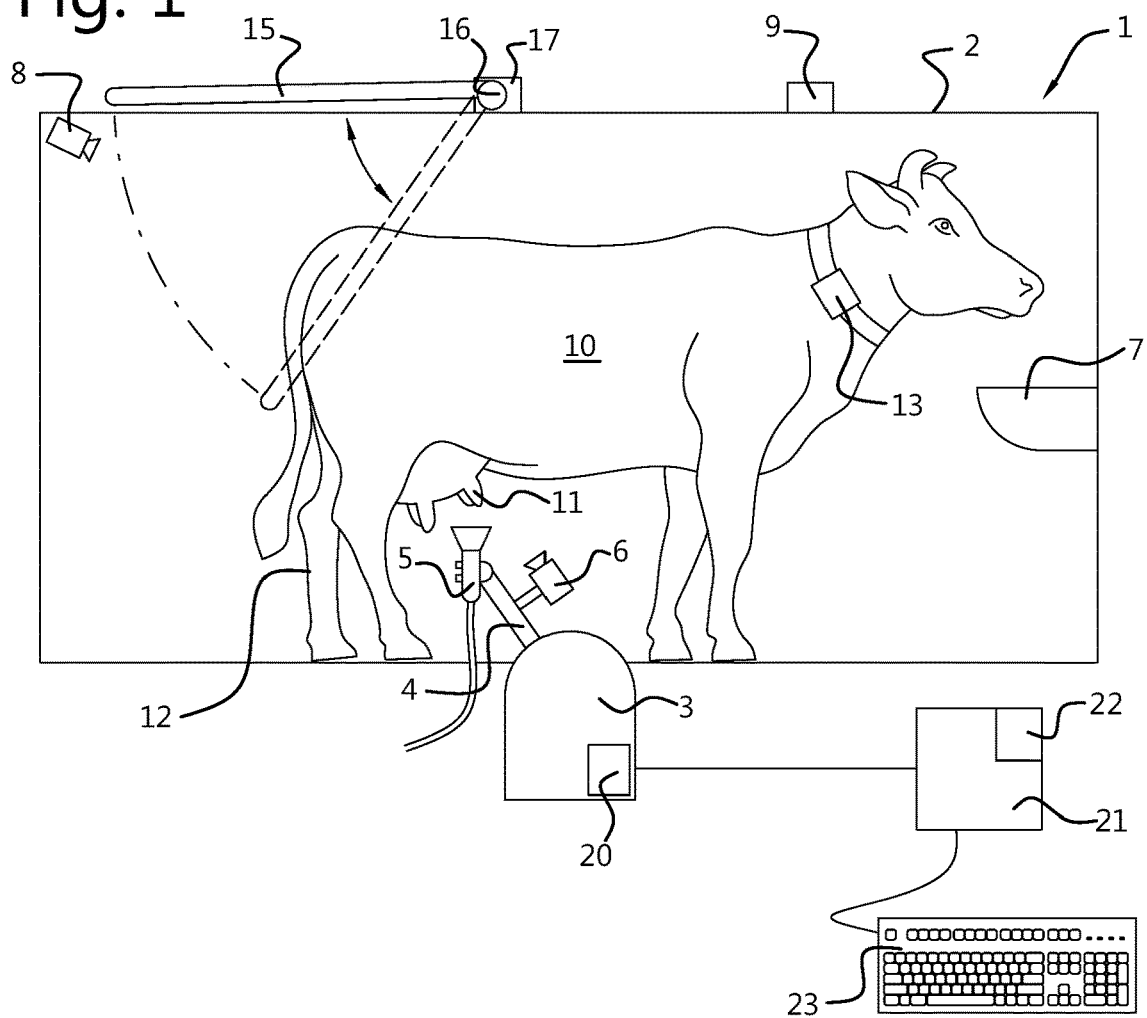

(51) Int. Cl.
*A01K 1/06* (2006.01)
*A01K 1/12* (2006.01)

(56) References Cited

U.S. PATENT DOCUMENTS

2004/0032974 A1* 2/2004 Kriesel ................ G06V 10/145
382/110
2007/0186859 A1* 8/2007 Moreau .................... A01K 1/12
119/14.03

* cited by examiner

MILKING SYSTEM WITH A POSITIONING AID

CROSS REFERENCE TO RELATED APPLICATIONS

This application is a National Stage entry under 35 U.S.C. § 371 of PCT/IB2023/053537, filed on Apr. 6, 2023, and claims priority to NL Patent Application No. 2031552, filed on Apr. 12, 2022, the entire contents of which are incorporated herein by reference.

The present invention relates to a robot milking system for milking a milking animal, provided with at least one milking box, milking means and a robot arm for connecting the milking means, as well as with an animal recognition device for automatically determining the identity of the milking animal, and with a control system for controlling the robot milking system, further provided with a positioning aid for determining the position of the milking animal in the milking box, which is movable by the control system between an inactive state away from the milking animal and an active state, which, at least during said connecting, is up against the milking animal.

From EP1020111, a robot milking system is known with a sensor system that is to be brought against the rear end of the milking animal, and that is connected to an attaching arm for the teat-cups. Thus, the position of the animal relative to the attaching arm has to be determined.

Moreover, it is known to shut in animals that are smaller than average or than for which the milking box is intended (as a maximum or average), or which are new or agitated, by means of brackets that are mounted in the milking box. Examples are Jersey cows in an average robot box, or cows that are newly in the milking robot, so-called initial milking cows.

Fitting of these brackets, which then have to be removed, takes an unnecessary amount of time and effort, and in addition limits the animals in their freedom of movement, which is undesirable.

One aim of the present invention is to provide a robot milking system that helps in an effective manner to calm agitated cows or initial milking cows, without needing to touch other milking animals unnecessarily or cage them or shut them in the milking box.

The present invention achieves the aforementioned aim at least partially by means of a robot milking system according to claim 1, in particular a robot milking system for milking a milking animal, provided with at least one milking box, milking means and a robot arm for connecting the milking means, as well as an animal recognition device for automatically determining the identity of the milking animal, and a control system for controlling the robot milking system, further provided with a positioning aid for determining the positioning of the milking animal in the milking box, which is movable by the control system between an inactive state away from the milking animal and an active state which, at least during said connecting, is up against the milking animal, wherein the control system is arranged to bring the positioning aid into the active state as a function of the identity determined.

The invention automatically adapts the positioning aid for example for new or agitated animals. Other milking animals are on the whole not subject to the positioning aid. This signifies that for these last-mentioned animals, which will form by far the largest group, on the whole no measure that hampers freedom is applied in the milking box, which is optimum for the calmness of these animals. For new or agitated animals, the positioning aid often has a soothing effect, which might be compared to the farmer's hand on the animal. In addition, the positioning means may help to limit the freedom of movement (actively), and it is also possible, just as in the prior art, to deduce the approximate position of the teats from the state of the positioning aid. Determination of the position of the milking animal thus takes place in two ways, namely both somewhat actively, by viewing "determine" as "limit (somewhat)", and passively, by viewing "determine" as "establish, measure". The invention is herein also based on the idea that it will be "known" by the control system whether a milking animal is new. Now, for that animal there will not yet be any (milking) data available, such as milk yield or teat coordinates. Of course, there are other possible ways of identifying an animal as new. However, it is important that the robot milking device itself can take this into account, by activating the positioning aid in such a case and placing it against the milking animal, but not in other cases. This is carried out automatically by the control system on the basis of the identity determined by means of the animal recognition device, and naturally the data stored in the control system, or even the absence thereof.

For example, the control system holds the positioning aid in the active state against the milking animal during substantially the whole milking operation. The soothing action may then be exerted throughout milking. Alternatively, the control system may also be arranged to hold the positioning means in the active state against the milking animal during connection of the milking means. Thus, the soothing action is exerted in particular during the phase of the milking operation that is the most critical in terms of robotics, and maximum freedom is provided in the milking box during the actual milking.

Particular embodiments, features and advantages are described in the dependent claims, as well as in the part of the description that now follows.

In some embodiments, the control system is arranged to bring the positioning aid into the active state for a predetermined number of visits, particularly the first visits, of the milking animal to the milking box, or for a predetermined number of days, particularly the first visiting days, the initial milking stage, of the milking animal to the milking box. For example, the animal is milked like this for the first seven days, wherein this number can be changed automatically or manually. It may be ensured that an initial milking animal is subject to the action of the positioning aid for said number of visits or days, and no longer thereafter. Thus, initial milking of the milking animal may take place automatically. The milking animal may thus get used to automatic milking in a calming manner, and the robot milking device can find the teats of the milking animal in an efficient manner in order to connect the milking means, and optionally to carry out other actions, such as cleaning, or application of an agent on the teats. The coordinates, which are not yet known initially, often lie within a range that is relatively limited with respect to the positioning aid, as is known per se in the prior art. Thus, the robot arm only needs to search for the teats in a correspondingly smaller spatial range.

In some embodiments, the robot milking system further comprises an animal management system that is connected operatively to the control system and contains a data file with the identity of each milking animal and an indication relating to bringing of the positioning aid into the active state. In general the control system may be arranged to place the positioning aid in the active state, if data relating to the animal are missing. If for example the identity cannot be determined, for example owing to a defective or missing identity chip, the control system may be arranged to milk the milking animal, even though the time of the last milking is unknown. After separation, in each case the point in time of the last milking will now be known. It is also possible that it is a new animal, the identity of which could be established, but it has not yet been registered. The control system must then assume that it is an animal for initial milking, and it will bring the positioning aid into the active state at the visit, and then milk the animal. In each case, if data are missing for only one single animal, said data may be coupled manually to the true identity of the animal, such as may be determined from the ear tag or the like. In general, however, it will be possible both to establish the identity of the animal and request the details from the data file, on the basis of said identity, and the control system can determine whether the positioning aid should be brought into the active state.

In particular, the animal management system is arranged to automatically generate, on inclusion of a new milking animal, in the data file an indication for bringing the positioning aid into the active state for that milking animal. The indication may be entered by the manager/farmer for each new animal that is to be registered. However, it is easier, and more reliable, if the control system, or at least the animal management system, generates this indication automatically. This indication may comprise a standard length, such as a predetermined number of milking sessions, for example selected from three and ten milking sessions, and for example after that number of milking sessions is automatically withdrawn by the control system, or for example on the basis of a criterion. For example, the control system is arranged to measure a stress-related parameter value of the animal, such as mobility during connection and/or milking, and to withdraw the indication when the value goes above or below a predetermined limit value.

Alternatively or additionally, the animal management system comprises an input means that is arranged to receive from an operating person instructions relating to said indication of a milking animal. The input means may comprise a keyboard, a touchscreen, an internet connection and so on. For example, the indication may be omitted if it relates to a milking animal that has been taken over from another firm and is already accustomed to (robot) milking. On the other hand, the indication may also be extended, whether or not manually, or for example be (re-)entered if there is another reason for this, such as temporary sensitivity of the teats due to or after mastitis or the like, getting accustomed again after calving, and so on. This re-entered indication may naturally also be withdrawn again, such as after a certain time, number of milking sessions, or on the basis of a predetermined criterion such as going above or below a limit value of a stress-related parameter value. As the occasion arises, the control system may be arranged for determining said stress-related parameter value from for example the movements that the robot arm must make during connection and/or milking in order to follow the animal, or the control system is provided with a sensor for measuring a stress value of that kind, such as a heart beat monitor.

For example, in the active state the positioning aid presses with a pressing force against the milking animal, wherein the pressing force is between 10 and 300 N, in particular around 102 N rounded, thus between 50 and 150 N. Said force is fairly consistent with the force that a farmer would exert on the milking animal when calming the animal or keeping it calm during connection and/or milking. For this purpose, the positioning aid may for example be provided with a spring device, a piston or some other actuator. Advantageously, the actuator of the positioning aid comprises a pressure gas actuator, in particular a compressed air cylinder. This has the advantages of easy adjustability and the possibility, in case of panic of the milking animal or the like, also to be compressible, in contrast for example to hydraulic actuators. This increases safety in emergency situations.

In particular, this pressing force is adjustable in the control system, such as on the basis of the identity. The indication in the control system may comprise a force setting of this kind. It is important to note that in advantageous embodiments the positioning aid gives way, and thus still offers the animal in the milking box freedom of movement. The milking animal is not confined. Thus, it will experience no stress, or at least less stress, during milking and will not recoil from going back to the milking box. Alternatively, the positioning aid may be arranged not to press against the milking animal with a force (constant, optionally adjustable per animal), but to occupy a position that is as constant as possible. This offers further advantages when determining the approximate teat positions, because the freedom of movement of the animal is restricted now. For example, the constant position may be entered in the data file beforehand, such as per milking animal (for example small/medium/large, depending on breed and/or age, etc.). It is also possible to determine the constant position per milking animal from a first milking session. The position found to be usable there for connecting the milking means can be stored in the data file automatically, so that this can then be set as the constant position in a subsequent milking session.

In some embodiments, the positioning aid comprises a swivellable and optionally also slidable component fastened to the milking box. The component is as such not especially limited, but in the inactive state it should not limit the freedom of movement of milking animals. Therefore in the inactive state the component is located outside the range of the milking animal, in particular outside the milking box, and is swivellable and optionally also slidable. "Swivellable" also comprises swing-away, collapsible and the like.

In particular, the positioning aid comprises a bracket. Although alternative forms are also possible for the positioning aid, such as a plate or rod, a bracket has the advantage that with a small amount of material it can nevertheless enclose milking animals of various sizes somewhat, and thus offer more calmness, or alternatively better containment. Such a bracket is advantageously fastened at both ends to the milking box, so that on the one hand it is fastenable sufficiently sturdily, and on the other hand if required it can reliably exert a sufficiently large force on the milking animal.

In particular, the bracket is swivellable about a substantially horizontal axis, wherein in the inactive state the bracket is located above the milking animal, and in the active state it presses against a caudal side of the milking animal, in particular an upper part of at least one of the hind legs. With this swivellability, it is easy either to provide optimum freedom of movement for the animal in the milking box, or to provide optimum positioning and/or calming of the milking animal.

The milking box is usually provided with an exit gate controllable by the control system. Advantageously, the control system is arranged to keep the positioning aid in the active state after milking the milking animal and after opening the exit gate. This means that the milking animal still feels some pressure even after milking and during and after the opening of the exit gate. This helps to drive the milking animal out of the milking box after milking, so that it quickly becomes available again for the next milking animal. In particular, the control system is arranged to increase, such as to double, the pressing force of the positioning aid after the exit gate has been opened.

In some embodiments, the positioning aid further comprises a sensor for determining the position of the milking animal in the milking box. A separate sensor may be provided per se, such as a camera or the like, but advantageously the positioning aid itself comprises such a sensor. In particular, the sensor is a rotation sensor for determining a rotation angle of the positioning aid. From the rotation angle measured by the sensor, the control system that is connected thereto is able to determine the position of the bracket, and therefore the position of at least the rear end of the milking animal relative to the milking box. Moreover, the teat position in the milking box will usually be determined, so that the control system can determine the difference from that, and therefore the relative position of the teats relative to the rear end of the milking animal. This measure, which is known per se, is helpful in subsequent milking sessions, for locating the teats more effectively.

Figure 2:
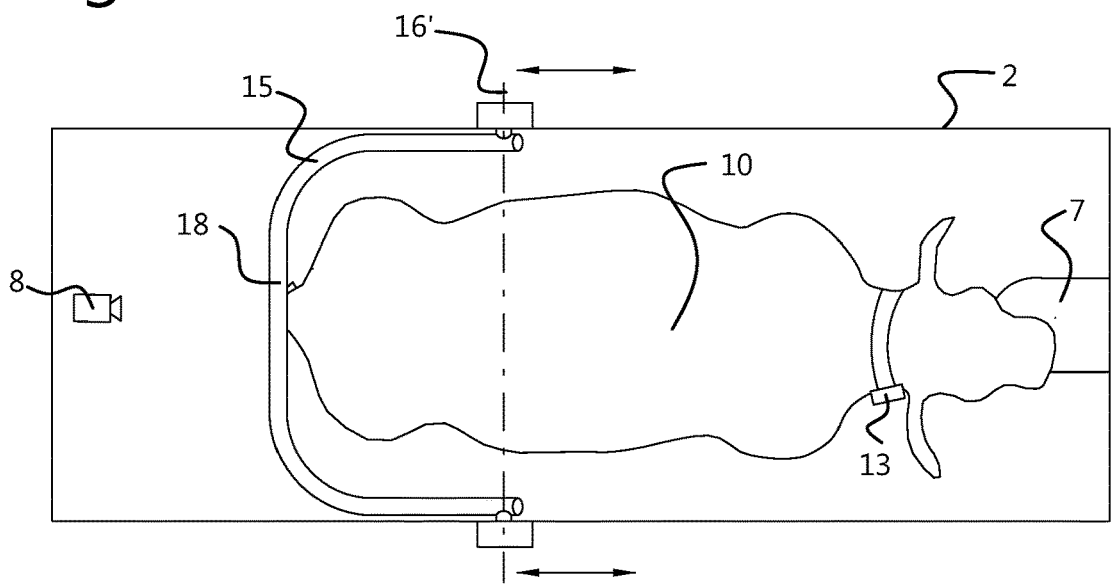

The invention will be explained in more detail hereunder on the basis of the drawing, in which some non-limiting exemplary embodiments are shown, where:

FIG. 1 shows a schematic side view of a robot milking system according to the invention, and FIG. 2 shows a schematic top view of a robot milking system according to the invention.

FIG. 1 shows a schematic side view, and FIG. 2 a schematic top view, of a robot milking system according to the invention. The robot milking system is indicated generally with the reference number 1, and comprises a milking box 2 with a milking robot 3 provided with a robot arm 4, a teat-cup 5 and a teat position detector 6, and with a feed trough 7, with an animal position detector 8 and with a tag reader 9.

A milking animal 10 has teats 11 and a hind leg 12, and carries an ID tag 13.

A bracket is indicated with 15, with an end 18. The bracket 15 is swivellable in the direction of the curved double arrow about a swivel axis 16 with a swivel axis centre line 16", and is optionally slidable in the direction of the straight double arrow. Moreover, an angle sensor 17 is optionally provided.

A control system is indicated with 20 and is connected operatively to an animal management system 21 with a data file 22 and coupled to a keyboard 23.

The robot milking system 1 comprises basically any known milking robot, only indicated here entirely schematically with the reference number 3. Examples are the Lely Astronaut® or the DeLaval VMS™ system. Such a system comprises a "milking robot" housing 3, with a robot arm 4, which can fit a teat-cup 5 on a teat 11 of the milking animal 10. For this purpose, a teat detection system is also provided, here in the form of a camera 6, such as a 3D camera, a stereo camera, or alternatively a laser sensor. Some robot arms are configured for carrying all teat-cups 5 at the same time, whereas others apply the teat-cups one by one.

When a milking animal 10 "checks in" in the milking box 2 to be milked, after entering the box it will be recognized by reading of the ID tag 13 with the tag reader 9. The identity of the milking animal 10 will thus be determined, and the control system 20 can pass this on to the animal management system 21, which searches in the data file 22 whether the milking animal should be milked with or without application of the positioning aid 15, such as for an initial milking animal or for an animal that has already undergone initial milking. In the latter case the control system 20 will carry out the milking as usual, i.e. the position of the teats 11 is sought by means of the teat position detector 6, after which the robot arm 4 places the teat-cups 5 on the respective teats 11 under the control of the control system 20. It is possible herein to determine the position of the milking animal 10, especially a rear end thereof, by means of the optional animal position sensor 8. From this, the control system 20 can deduce the approximate position of the teats 11, so that connection can proceed effectively. Note that the animal position sensor 8 will in particular be a contactless sensor, so as not to disturb the milking animal 10 unnecessarily. The sensor 8 is for example a stereo or 3D camera, ultrasonic sensor, and so on.

If the recognized milking animal 10 has an indication "to be milked with positioning aid" in the data file 22, such as an animal for initial milking or an agitated animal, according to the present invention this will be adapted by the control system 20. After entering the milking box 2 and being recognized, the milking animal 10 will be positioned and/or calmed by means of the bracket 15, which serves as a positioning aid. This bracket 15 swivels about the swivel axis 16 from above and outside the milking box 2 downwards, until it presses against the milking animal 10. This milking animal 10 will generally be attracted by feed in the feed trough 7. A larger milking animal will extend further back in the milking box 2 than a smaller milking animal. This ensures that the milking bracket 15 in each case presses at a comparable relative height against the milking animal 10. Advantageously, the point of pressing is at the level of the fleshy part of the hind leg 12, such as at the level of the udder/the teats 11. However, some other position, such as higher on the hind leg/legs 12, is not excluded. With the bracket 15 pressed against the milking animal 10, the latter will not only be positioned to some extent, but also calmed, so that connection of the teat-cups can take place more efficiently and more reliably.

Optionally, it is possible to make the bracket 15, or any other positioning aid according to the invention, slidable in the longitudinal direction of the milking box 2, such as along a longitudinal beam or rail. The control system 20 can then, after recognizing the milking animal 10 as "to be milked with positioning aid", swivel the bracket 15 into position and if required, push the bracket forwards or backwards, for example as a function of the size of the animal.

For the purpose of swivelling, and optionally displacing, the bracket 15, an actuator, not shown separately, is provided, which advantageously comprises a compressed air cylinder. As a result, the bracket 15 can move elastically somewhat, together with the milking animal 10, so that it might not feel agitated and confined. However, if the animal panics, because the bracket 15 moves elastically it is safer than a blocked system such as a hydraulic system. However, a hydraulic system may also function well if additional safety measures are taken, such as overpressure protection and the like.

In this embodiment, the control system 20 is connected to an animal management system 21. This is shown here as an external system, which for example operates on a stock-rearing PC. However, it is also possible for the animal management system 21 to be incorporated in the control system 20. In each case it will contain a data file 22 with data on the milking animals 10, such as, according to the invention, the status whether or not to be milked using the positioning means. This status may be assigned automatically by the control system 20 or the animal management system 21, when the animal is entered in the system. If still no (other) data on the milking animal 10 are known in the animal management system 21/data file 22, it will be concluded that it is an initial milking animal, and it will automatically be assigned the status "to be milked with positioning aid". This status may be overwritten for example by the manager/farmer by corresponding correction via the keyboard 23, or some other input means. The status may in all cases also be entered manually, via the same keyboard 23 or the like. As standard, the status "to be milked with positioning aid" may mean that the milking animal 10 is milked with bracket 15 activated for a predetermined number of days, such as 7 days. Of course, any other desired number of days is also possible. At the end of this number of days, the status will be reset automatically to "to be milked without positioning aid" by the animal management system 21 or the control system 20, unless this is overruled by the manager, or based on fulfilment of a criterion, which is discussed in more detail hereunder.

Even when a milking animal has already undergone initial milking, it may in some cases be advisable to assign or maintain the status "to be milked with positioning aid". For example, if the milking animal 10 is (too) agitated, and even at the end of the initial milking stage with the positioning aid, it seems to be difficult to connect the teat-cups 5. This may for example be determined automatically by the control system 20 by comparing the required connection time with a threshold value. If the threshold value is exceeded, for example the status remains "to be milked with positioning aid", until the connection time has remained below the threshold value at least a predetermined number of times. It is also possible that an animal milked normally per se becomes agitated for some reason or other, such as because of an intruder in the stable, because of sensitive teats, and so on. This agitation may for example arise because the connection time exceeds said threshold value. It may also be deduced from the position of the animal measured by the animal position sensor 8, and the change thereof over time. If this change (and thus the rate) is too great, the milking animal is too agitated to be connected reliably and quickly, and the control system 20 may change over to activation of the bracket 15 and milking of the milking animal 10 therewith. If required, such as after repeated occurrence of excessive agitation, the control system may also change the indication/status to "to be milked with positioning means". As the occasion arises, the milking animal in question may then be milked for a predetermined number of days, this number being different than for initial milking animals.

In the active state the bracket 15 presses with a pressing force F against the milking animal 10. The magnitude of F can in principle be chosen freely, but a useful value is for example around 102 N, which in order of magnitude matches the force that a farmer would exert on the milking animal. This value may also be selected depending on the identity of the milking animal. It is also possible for the control system to be arranged to adjust the pressing force as a function of time. This applies both to the pressing force during a milking session, which for example may decrease from one milking session to another, and promotes the habituation, and/or initial milking, of the milking animal, and to the variation of the pressing force during a milking session itself. For example, it is possible to apply a larger pressing force during connection of the teat-cups than during milking with all teat-cups, because positioning of the milking animal is more critical then. It is also possible, if the milking box 2 has an exit gate at a front (directly in front, or front-left or front-right, but not shown separately here), and the control system 20 increases the pressing force when the milking is over and the exit gate opens. This may stimulate the milking animal to leave the milking box 2. It may be increased in any desired manner, such as stepwise or gradually, to any value to be set, such as 50% or 100% more than during connection/milking. The bracket 15 may turn further, so as to continue pressing against the milking animal 10.

The optional animal position sensor 8 shown serves for determining the position of the milking animal 10 in the milking box 2. Alternatively, the optional angle sensor 17 may be used for determining the position of the animal. The angle sensor 17 measures the angular displacement of the bracket 15, until the end 18 thereof rests against the milking animal 10. From this angular displacement, the control system 20 is able to determine the position of said end 18, and therefore of the rear end of the milking animal 20. Note that if the bracket is also slidable along the milking box, this displacement is measured with an extra sensor, in order to determine the position of the animal from this displacement as well as the angular displacement. It should be noted, moreover, that the animal's position may of course still, for example additionally, be determined by means of the animal position sensor 8.

The embodiment shown is not intended to be limiting. The scope of protection of the invention is determined by the appended claims.

The invention claimed is:

1. A robot milking system, comprising:
   at least one milking box;
   milking means;
   a robot arm configured to connect the milking means to a milking animal;
   an animal recognition device configured to automatically determine an identity of the milking animal;
   a control system configured to control the robot milking system; and
   a positioning aid configured to determine a position of the milking animal in the at least one milking box,
   wherein:
   the positioning aid is movable by the control system between an inactive state away from the milking animal and an active state up against the milking animal,
   the positioning aid is in the active state at least when the milking means is connected to the milking animal,
   the control system is configured to bring the positioning aid into the active state as a function of the identity determined by the animal recognition device, and
   the control system is configured to bring the positioning aid into the active state for a predetermined number of visits or for a predetermined number of days.

2. The robot milking system according to claim 1, further comprising:
   an animal management system connected operatively to the control system, the animal management system including a data file with the identity of the milking animal and an indication relating to bringing the positioning aid into the active state.

3. The robot milking system according to claim 2, wherein the animal management system is configured to automatically generate, on inclusion of a new milking animal, an indication for bringing the positioning aid into the active state for the new milking animal in the data file.

4. The robot milking system according to claim 3, wherein the animal management system is configured to receive, from an operating person, instructions relating to the indication for the new milking animal.

5. The robot milking system according to claim 2, wherein the animal management system is configured to receive, from an operating person, instructions relating to the indication for the milking animal.

6. The robot milking system according to claim 2, wherein in the active state, the positioning aid presses with a pressing force against the milking animal, wherein the pressing force is from 10 to 300 N.

7. The robot milking system according to claim 2, wherein in the active state, the positioning aid presses with a pressing force against the milking animal, wherein the pressing force is from 10 to 300 N.

8. The robot milking system according to claim 2, wherein the predetermined number of visits are the first visits of the milking animal to the milking box.

9. The robot milking system according to claim 2, wherein the positioning aid comprises a swivellable or slidable component fastened to the at least one milking box.

10. The robot milking system according to claim 2, wherein the positioning aid comprises a swivellable or slidable component fastened to the at least one milking box.

11. The robot milking system according to claim 1, wherein in the active state, the positioning aid presses with a pressing force against the milking animal, wherein the pressing force is from 10 to 300 N.

12. The robot milking system according to claim 11, wherein the pressing force is from 50 N to 150 N.

13. The robot milking system according to claim 1, wherein the positioning aid comprises a swivellable or slidable component fastened to the at least one milking box.

14. The robot milking system according to claim 13, wherein the positioning aid comprises a bracket.

15. The robot milking system according to claim 14, wherein the bracket is swivellable about a substantially horizontal axis, wherein in the inactive state the bracket is located above the milking animal, and in the active state the bracket presses against a caudal side of the milking animal.

16. The robot milking system according to claim 15, wherein the bracket presses against an upper part of at least one hind leg of the milking animal.

17. The robot milking system according to claim 1, wherein the at least one milking box comprises an exit gate controllable by the control system, wherein the control system is configured to keep the positioning aid in the active state after milking the milking animal and after opening the exit gate.

18. The robot milking system according to claim 1, wherein the positioning aid further comprises a sensor configured to determine the position of the milking animal in the at least one milking box.

19. The robot milking system according to claim 18, wherein the sensor comprises a rotation sensor configured to determine a rotation angle of the positioning aid.

* * * * *